REMOTE-CONTROL SYSTEMS WITH CODED AUDIO SIGNALS

Filed Dec. 24, 1963 4 Sheets-Sheet 1

INVENTOR
NOEL G. DUNCAN
BY
AGENT

REMOTE-CONTROL SYSTEMS WITH CODED AUDIO SIGNALS

Filed Dec. 24, 1963 4 Sheets-Sheet 2

INVENTOR
NOEL G. DUNCAN
BY
AGENT

REMOTE-CONTROL SYSTEMS WITH CODED AUDIO SIGNALS

Filed Dec. 24, 1963 4 Sheets-Sheet 3

INVENTOR.
NOEL G. DUNCAN
[signature]
AGENT

United States Patent Office 3,384,713

Patented May 21, 1968

3,384,713

REMOTE-CONTROL SYSTEMS WITH CODED AUDIO SIGNALS

Noel G. Duncan, 1408 Franklin Ave., Bronx, N.Y. 10456

Filed Dec. 24, 1963, Ser. No. 333,119
17 Claims. (Cl. 179—2)

ABSTRACT OF THE DISCLOSURE

System for remotely controlling a terminal circuit over a transmission or communications line. The system basically comprises a sending and a receiving station; the former may have sound generator means for emitting a coded group signal which reaches the latter over the communications line. At the receiving station, the coded signal is received, filtered and fed to multi-position switching means. If a predetermined coded group signal reaches the receiving station, one or more functions of a controlled unit are initiated or performed.

The present invention relates to remote-control systems, and more particularly to a system for controlling a terminal circuit by remote control. The system is adapted to control such a terminal circuit over a conventional transmission or communications line, e.g. a telephone circuit between individual stations or apparatus of a public or private telephone circuit system.

The remote control of a terminal circuit does not present noteworthy difficulties if the control circuit is designed exclusively for controlling the terminal circuit. Various suitable circuit control systems and follow-up systems have been designed for this purpose. However, various problems arise when the control circuit used for transmitting the controlling signals is also used for the transmission of other signals, for example, the transmission of intelligence over a public telephone installation.

In remote-control systems of the class mentioned, it is imperative that the circuit be adapted to distinguish between correct and intentional operation by an authorized user and incorrect or malicious operation by non-authorized users. Control of the terminal circuit has to be prevented in all cases except when the authorized user or users actuate the system. Various arrangements and circuits have become known for this purpose, operating by combinations of a predetermined signal frequency, duration or intervals therebetween.

Hitherto known systems, however, present various difficulties and drawbacks which have to be overcome if a foolproof operation has to be insured. One of the drawbacks resides in the rather complicated and costly mechanical and electrical elements required in the terminal circuit, and sometimes even in the device used for remotely controlling the terminal circuit. Some of the known devices are not free from interference from the telephone or other signal transmission circuit over which the control signals are transmitted. Thus, for example, clicks, extraneous noises and the like may trigger or influence the operation of the terminal circuit which then becomes blocked and inoperative for activation by the authorized user when needed.

In certain known systems more than one frequency is used, singly or in combination, for remotely controlling various functions to be performed at the terminal circuit. This not only renders the transmitter or code sender bulky and expensive, but unnecessarily complicates the receiver or decoder at the remote end.

It is the object of the present invention to provide an improved remote-control system which avoids the drawbacks of and difficulties encountered with previously known systems, yet is simple to manufacture, install and operate. The inventive system has to be adapted to operate over any conventional signalling transmission or telecommunications circuit, wired or wireless, private or public.

It is also one of the objects of the invention to provide a device which does not interfere in any way with the installations of telephone companies, and with the normal use of telephone circuits over which the remote control system may be operated.

It is another object of the invention to provide a means for selectively and optionally operating any one of a plurality of predetermined functions at the terminal circuit. These functions may include domestic or industrial appliances, telephone answering devices (sometimes called telephonographs), dictating machines and the like.

It is yet another object of the invention to limit the use of the remote-control system to authorized users, whether equipped with a code sender or not, and to prevent any misuse by non-authorized persons. At the same time, the novel system has to return to normal operating condition after each erroneous or attempted signal so as promptly to keep the terminal circuit ready for the authorized user.

Still another object of the invention relates to the provision of a pre-arranged signal code to which the terminal circuit of the remote-control system has to respond. This code may be changed at will so as to adapt the system to varying conditions. It is also possible to allow one kind of function to be controlled or triggered by one user, and another function or more functions by another user, within the same remote-control system and with the same terminal circuit.

It is also the object of the present invention to provide a system which utilizes audible signals only, easily transmitted over telephone lines and the like, the frequency range of which is known to be limited to a certain speech-frequency range. While preferably a single discrete audio frequency is provided in the terminal circuit or receiver, but optionally only in the sender, provisions are made, according to this invention, effectively to filter out random noises, unwanted frequencies (e.g. those resulting from bursts of noises, dropping of a telephone hand-set, whistles of an unwanted frequency, etc.). According to this particular object of the invention, switching clicks originating from the telephone circuit proper will also be effectively kept from adversely influencing the receiving or terminal circuit.

It is, furthermore, one of the objects of the present invention to provide filter or blocking means for unwanted frequencies falling outside the predetermined discrete frequency or frequency range. Such filter arrangements, as will be described hereunder in full detail, may be used for other purposes wherein a discrete frequency is required to pass alone while adjoining and different frequencies have to be attenuated to an extent as to be negligible. However, the filter or blocking means alone does not form the subject matter of the application.

According to one of the major features of the invention, the remote-control system comprises a receiving or decoding unit, which can be termed a terminal circuit, adapted to receive a sequence of coded signals of a predetermined discrete frequency. The terminal circuit may include conventional amplifier and electric control means, together with the afore-mentioned filter or blocking means which allows only the predetermined frequency to pass.

According to another important feature, the filter means preferably contains electro-mechanical transducer means for converting the received electric signals containing various intelligence (mixed frequencies, speech, noises, etc.) into mechanical vibrations, filtering out by self-resonance and associated phenomena the unwanted frequency ranges, and re-converting the vibrations into electric signals, whereby a single, predetermined frequency is only allowed to pass. It is a particular feature of applicant's novel filter or blocking means that the coded signal is in no way distorted or attenuated; it is only the level of unwanted frequencies which is effectively reduced.

A special feature of the novel filter means provides one or a pair of balanced vibration-transmitting linking members, such as resilient coils or springs, adapted mutually to compensate for each other's vibratory motions. In the exemplary embodiment of the filter means described herein, small transducers, such as a speaker and a crystal-type microphone, are used in conjunction with said pair of balanced springs.

According to yet another feature of the invention, a sending or coding unit may optionally be used, although whistling with the lips alone, or by the aid of a mechanical whistle, may be applied just as well, if the predetermined code is carefully observed. According to the invention, the optiional sender may comprise a conventional oscillator stage, with or without an amplifier; the coded signal can alternatively be provided in the sender by a manually operable telephone-type dial, or by a motor-driven or spring-actuated sequential device, e.g. having cams, disks or a plurality of contact members.

It is a special feature of the invention that the sending unit, while not absolutely necessary for the proper operation of the receiving unit, can be made very compact, simple and foolproof in operation. It may be made small enough to be carried in the user's pocket, pocketbook or briefcase.

Still another feature of the invention resides in the provision of a terminal circuit comprising a stepping relay in conjunction with a plurality of self-locking relays, adapted to control the functions to be performed by the remote system. A minimum number of circuit elements is provided.

The invention provides a novel electric circuit in which said stepping relay performs multiple functions in controlling at least two separate circuits, one for said self-locking relays, and one for at least one more relay fed by a different supply circuit.

According to still further features of the terminal circuit, the switching positions performing the abovementioned functions may include those for co-operation with a telephone answering device, dictating machine or the like. The operation of the terminal circuit may, optionally, be made dependent upon, and, in turn, also control, the telephone answering device with which it is made to operate. In this manner, completion of one of a number of predetermined codes may play back messages accumulated in the telephone answering device, while another code may trigger (even subsequently) the re-recording of a new outgoing message for the device, and/or a playback (for confirmation purposes) of said message.

In conjunction with centralized dictating systems, the inventive remote-control system may allow to control the starting and stopping, playback, erase and other functions of the dictating system.

The various objects, features and attendant advantages of the present invention will become more apparent from the following description of a preferred exemplary embodiment, and certain modifications, when considered in conjunction with the accompanying drawings, wherein FIG. 1 is a schematic arrangement of an exemplary embodiment of a remote-control system according to the invention, showing sending and receiving stations in connection with a signal transmission circuit;

FIG. 1*a* is a schematic arrangement similar to that of FIG. 1, with a few identical circuit elements omitted for the sake of clarity, of another remote-control system, showing the arrangement in connection with a telephone circuit;

FIG. 2*a* is a schematic, exemplary embodiment of one sending unit that can be used with the arrangements of FIGS. 1 or 1*a*;

FIG. 2*b* is another embodiment of a sending unit, similar to that shown in FIG. 2*a*;

In accordance with its basic concept, the inventive remote-control system is adapted for controlling at least one function of a controlled unit operatively connected to a receiving station, from a sending station connected with the former over a signal transmission circuit which is also used for the transmission of signals other than control signals for the receiving station.

Such a transmission circuit may be provided for handling acoustic or other signals, and the system according to the invention will not interfere in any way with the orderly operation of the circuit. Bell or signal systems, fire warning installations, telemetering circuits, as well as telephone installations are examples of such transmission circuits.

An exemplary embodiment of the inventive remote-control system will now be described first with reference to a signal transmission circuit, as a basic arrangement, while another embodiment, using a telephone circuit, will be discussed somewhat later.

Figure 1:
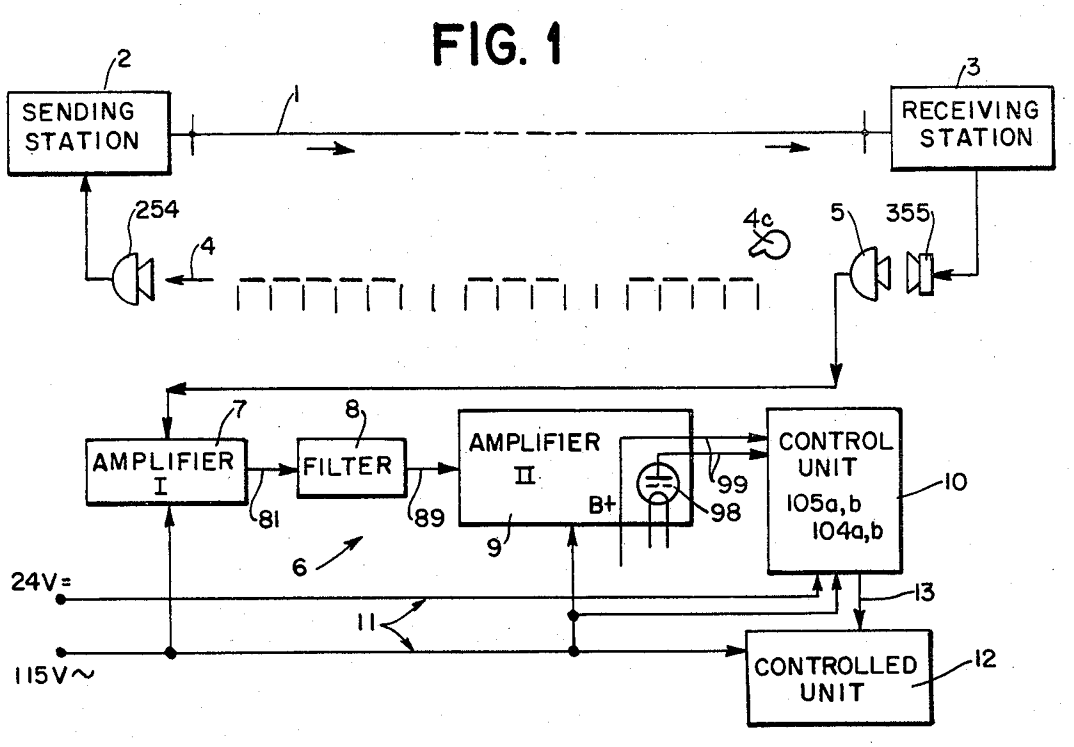

FIG. 1 shows the overall arrangement of the first explary embodiment in connection with a signal transmission circuit generally designated 1. Stations 2 and 3 are connected to the circuit 1. Station 2 will be assumed to be the one from where a remote-control operation is to be initiated, and can be termed the sending station; on the other hand, the control circuit will be shown associated, as a matter of example, with station 3 which thus can be termed the receiving station.

The electrical circuit of station 2 has connected thereto a microphone 254 while a receiver or speaker 355 is shown in connection with station 3. At station 2, an example of a predetermined coded signal is schematically shown at 4, consisting of five pulses, an interval, three pulses, another interval, and four more pulses. The pulses have substantially the same duration, while the intervals should correspond to at least the length of two pulses combined, as has been visualized by the equidistant division lines thereunder.

Figures 2A, 2B, 7:
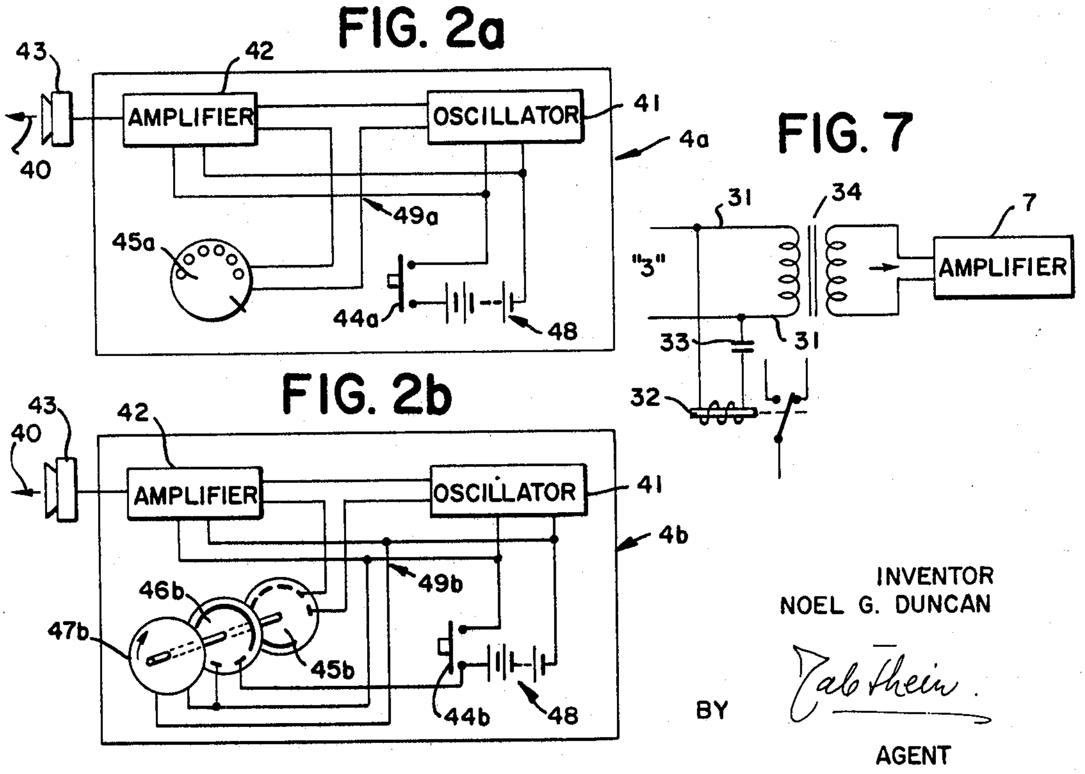
FIG. 7 is a partial schematic circuit illustrating an alternative manner to connect the receiving unit of FIG. 1*a* to a telephone line.

As will be explained hereunder in more detail, an audio frequency of, say 3000 cycles or 5000 cycles may be used for the remote-control system. In FIG. 1, the sound required for the coded signal has been visualized as being emitted from a small whistle **4*c* which is operated by the user of the system. As the description proceeds, alternative sender or coding units 4*a*, 4*b*** will be described (FIGS. 2*a* and 2*b*, respectively). The coded signal is transmitted from station 2, through the signal transmission circuit 1, to station 3, substantially as shown. Electric power, amplifier and other conventional means, are not illustrated.

At the receiving end, the coded, rhythmic "beeps" will be audible at 355. The terminal circuit is generally designated 6 and includes a microphone 5 placed in adjacent relationship with receiver 355, a preliminary amplifier 7, a filter or blocking unit 8, another amplifier 9, and a control unit 10 which will be explained in full detail with reference to FIG. 8.

Numerous 11 designates various, schematically shown supply circuits (e.g., those furnishing 24 v. D.C., conventional 115 v. A.C.) for the elements 7 to 10. A controlled unit is schematically shown at 12, while 13 denotes the lines connecting the controlling and controlled units 10, 12.

Microphone 5 picks up the coded signal "beeps" amplifier stage 7, which may have conventional solid-state or electron-tube elements, increases the signal strength. The following filter unit 8 (shown in FIGS. 3 to 6 in detail) has an input 81 and an output 89, the latter leading to the optional second amplifier stage 9 which feeds the control unit 10. The filter unit 8 is pre-set to the exact frequency, e.g., 3000 or 5000 c./s., to which the sending means *4a*, *4b* or *4c* is adjusted, or at which the user of the system is supposed to whistle if only human sound is to be used.

With any change in the oscillating frequency of unit *4a* or *4b*, or with a whistle *4c* having a different pitch, the unit 8 will have to be adjusted accordingly. The latter will allow the predetermined frequency to pass, while all other signals will be attenuated to a degree incapable of triggering unit 10. More details will be given in this regard as the description proceeds.

Figure 1A:
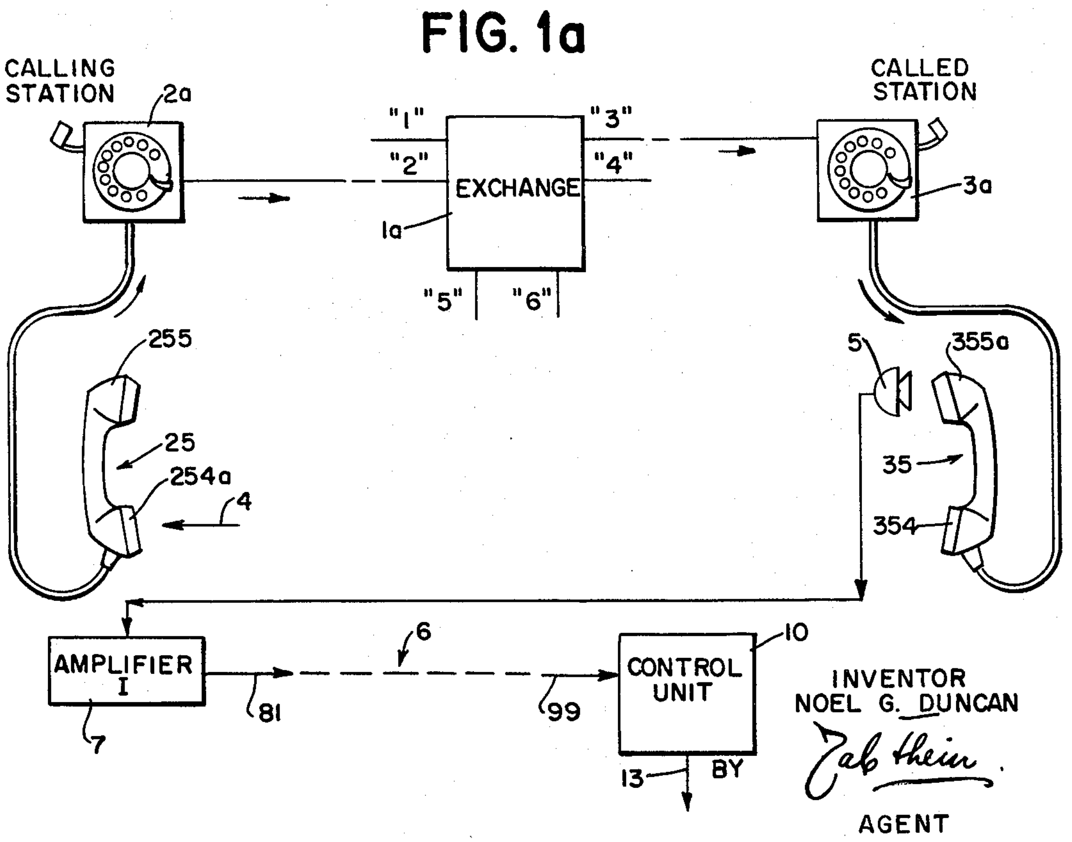

FIG. 1*a* shows the arrangement of the second exemplary embodiment according to the invention, similar to that of FIG. 1 but in connection with a telephone circuit. In this case numeral 1*a*, the equivalent of 1 in FIG. 1, designates a conventional telephone exchange having a plurality of subscriber lines, e g. those identified by "1," "2," "3," "4," "5" and "6." The electrical switching, supply and other elements forming part of the exchange have been omitted. Lines "2" and "3" are respectively connected to subscriber stations 2*a* and 3*a*, schematically showing the usual dials, hookswitches and handsets 25, 35, respectively. Station 2*a*, similar to station 2 of FIG. 1, is the calling or sending station while station 3*a*, similar to 3 of FIG. 1, is the called or receiving station, as has been explained before.

The telephone handsets 25, 35 have respective microphone portions 254*a*, 354 and receiver portions 255, 355*a*. At station 2*a*, the above-described coded signal 4 is schematically shown by an arrow. It will be understood that the explanations given hereinabove in connection with the embodiment of FIG. 1 apply to the set-up of the alternative embodiment of FIG. 1*a*.

At the receiving end, the coded, rhythmic "beeps" will be audible at 355*a*. The terminal circuit 6 has its microphone 5 placed in adjacent relationship with the receiver portion 355*a* of the handset 35. Parts of the circuit 6 have been omitted from FIG. 1*a* for the sake of clarity, and only the amplifier 7 and the control unit 10 are shown, the latter with line 13 leading to the controlled unit, as shown in full in FIG. 1. The operation is otherwise similar to that described before. Features characteristic for the telephone service will be explained later as the description proceeds.

FIGS. 2*a* and 2*b* represent substitutes for the simple sound generating means (a whistle) shown at *4c*. It will be understood that this may be omitted if the user of the system of either FIG. 1 or 1*a* is capable of emitting a whistled human sound of the very frequency required. Thus, it is not absolutely necessary to have any of the means indicated at *4a*, *4b* or *4c* used for impressing the coded signal 4 to the system.

In FIG. 2*a*, a sender or coding unit *4a* appears which comprises a conventional oscillator 41, an amplifier stage 42 following it, and a small speaker or transducer 43. In the electric connecting circuit schematically shown at 49*a*, a conventional dial 45*a* is intercalated, for interrupting the signal path between units 41 and 42 in the rhythm of the digit dialed. A push-button type switch 44*a* is shown, connecting an electric supply source 48 to unit 41, and therethrough to the other elements of the coding unit *4a*. In this embodiment, switch 44*a* has to be held depressed for the entire duration of the signal emission; as the contacts of dial 45*a* interrupt the circuit, in a manner known per se, transducer 43 will emit the coded signal, as indicated at 40, which is selected by the proper use of the dial, to be that illustrated in FIGS. 1 and 1*a* at 4.

In FIG. 2*b*, another sender or coding unit *4b* is shown, some elements of which, like 41, 42, 43 and 48, are identical with those already described. In this case, push-button 44*b* has to be depressed only temporarily for energizing a small motor 47*b*, the shaft of which carries one or more contact discs, as shown at 45*b* (for interrupting the signal) and at 46*b* (for providing a self-holding circuit for the motor). The drawing only shows a few conductive segments, although the actual arrangement would of course include the same arrangement of "5–3–4" digits on contact disc 45*b*, as illustrated at 4, while disc 46*b* may have a single arcuate or annular contact for energizing the circuit throughout the duration of the coded signal. The electric circuit is denoted 49*b*, while the signal emitted by transducer 43 is again shown at 40.

It will be understood by those skilled in the art that the elements of units *4a*, *4b* have been shown as a matter of example only, since equivalent elements (e.g. a relay chain, a spring-wound power source, different contact means) may be used as long as they co-act in providing the same sequence of "beep" signals constituting a predetermined coded signal.

Now we come to the details of the filter unit 8, shown in FIGS. 3–6. A frame or support 80 carries a small electro-mechanical transducer or speaker 82, and a mechano-electrical transducer or crystal unit 88, the latter being secured to a plate member 83 which is slidable toward and away from speaker 82 along support 80. To this end, member 83 has a lower portion 83*a* surrounding an elongated, preferably slotted portion of support 80 so as to be movable therealong. A screw or other conventional means is provided for fixing portion 83*a* with respect to the slot 80*b* in support 80.

The remote end of support 80 has an upwardly bent portion 80*a* which has a threaded bore therein, through which passes a threaded rod 84 rotatably but non-removably attached to the end of portion 83*a*. The outer end of rod 84 has a knob 85 or like member secured thereto by means of which members 83*a*, 83 can be moved in either direction owing to the engagement of the threads in 80*a* and 84.

Figures 3, 4, 5, 6:
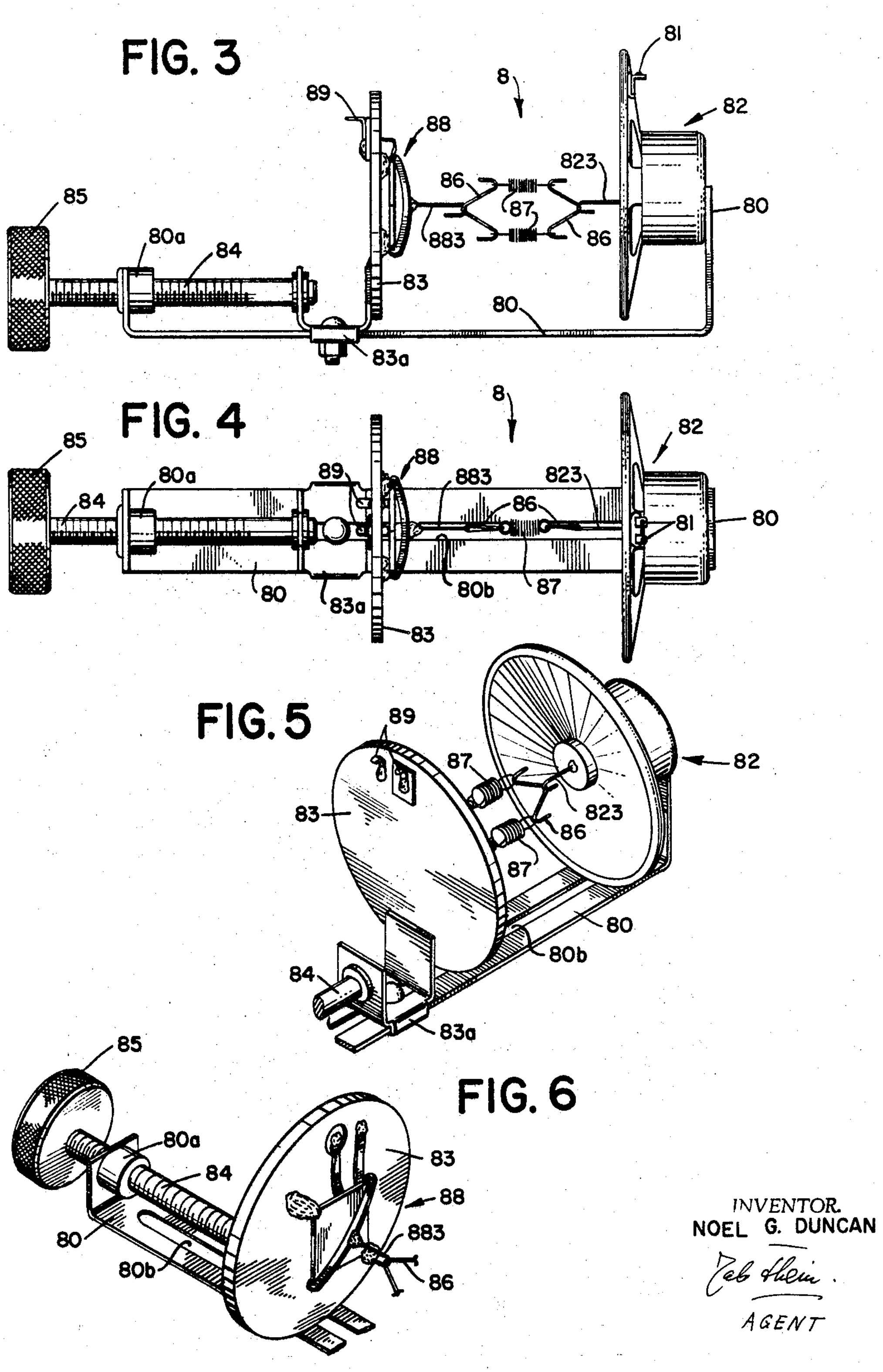
FIG. 3 is a side elevation of a filter means forming part of the inventive remote-control system.
FIG. 4 is a top view of the filter means shown in FIG. 3.
FIG. 5 is a perspective view taken in a direction toward the input transducer of the filter means.
FIG. 6 is a view similar to that of FIG. 5 but in a direction toward the output transducer, with parts omitted.

Both transducers 82, 88 have a small attaching rod or wire 823, 883 attached thereto by conventional means, e.g. gluing, soldering, etc., in a manner best seen from FIGS. 5 and 6 for the two transducers. The opposite, bent ends of rods 823, 883 are engaged by substantially V-shaped links 86 between which a pair of springs 87 is supported. While the connection between the transducers and the rods is rigid, each linking wire 86 allow free pivotal movement both for the springs 87 therebetween and with regard to the outwardly connected member 823, 883. By judiciously adjusting the threaded rod 84 with knob 85, the distance between the transducers 82, 88 can be finely regulated, providing thereby a predetermined degree of tensioning for the spring 87. It is understood that the reciprocation of system 83, 83*a* will maintain crystal unit 88 substantially parallel at all times with regard to speaker 82.

Terminal lugs 81 of speaker-transducer 82, as well as lugs 89 of microphone-transducer 88 correspond to the respective input and output terminals shown in and explained hereinabove with regard to FIG. 1. The purpose of filter or blocking unit 8 is to provide a mechanical link in the path of electrical transmission of the audio signals, whereby a discrete frequency may be allowed to pass without noteworthy attenuation while all higher and lower frequencies will be filtered out.

The thickness of the springs 87 and their material is so chosen as to provide, for example, a self-resonant frequency of 3000 or 5000 c./s., or any other value within the audible range but high enough to be rarely or never emitted during normal speech. Thus, the so-called dial tone and/or any conversation on the telephone line 1*a* of FIG. 1*a* will be filtered out effectively so that the amplifier stage 9 following the filter 8, if provided, or the control unit 10, will not be impressed but by the coded signal sequence meant for the latter unit. The same will of course apply to any unwanted frequency in the signal transmission circuit 1 of FIG. 1.

Within the terminal circuit 6, the filter unit 8 is preferably elastically supported or embedded in foamed plastic or the like cushioning material which keeps extraneous vibrations away. Frequency adjustment can be made with knob 85 so as to displace the sliding support means 83, 83*a*. The support 80 may have a graduation thereon allowing more or less precise adjustment to particular resonant frequencies. For substantialy changes (e.g., from 3000 to 5000 cycles), springs made from heavier or thinner wire will be used, each allowing a limited range of adjustment by appropriate tensioning.

FIGS. 3, 5 and 6 clearly show the manner in which the wires 823, 883 are attached to the transducer elements 82, 88. For speaker 82, a small plate member is glued or otherwise attached to the center of the moving coil. The crystal-type microphone element 88 is held on plate 83 by small adhesive or solid wax masses provided at diagonally opposite corners while the remaining corners are connected by a small bridge member (best seen in FIG. 6) to which the respective attaching wire 883 is secured. Both the speaker and the crystal unit may, of course, have different structural details as long as they allow the mechanical link to be inserted therebetween as provided by V-shaped members 86 and spring 87.

It is important that free pivotal movement be allowed at the bent-back ends of rods 823, 883 and links 86. It has been observed that strong signals tend to act on the springs in a somewhat asymmetrical manner; then, the axial swing or vibration of one spring, if larger than that of the other, will to a degree be taken up by a lateral pivotal action which occurs at the bent-back ends.

The underlying principles could not be fully investigated so far; however, it has been found that a single spring supported between the transducers in a tensioned manner does not provide the required filtering effect. Similarly, a rigid connection at the spring ends has proven to be dissatisfactory. Applicant believes that the mass and inertia of springs 87, in a tensioned state, impart a certain delayed-action sluggishness to the mechanical link represented by the filter unit 8 in the all-electrical system of the present invention.

Purely electrical filter means have also been used in the inventive remote-control system but with a lesser degree of reliability. Thus, certain types of conventional band-pass filters can be used in the system, although the best results have been obtained with the unit just described.

If the exemplary embodiment of the inventive remote-control system as shown in FIG. 1*a* is used in connection with a telephone answering device, the latter will sense the first ringing signal of an incoming call in the customary manner, for initiating the operation of the answering device. In such cases there is no need for specific measures to "pick up" to handset or close the called subscriber's line. This would actually constitute a combined arrangement wherein the remote-control system has to co-operate, e.g. for the energization of its terminal or control circuit, with the telephone answering device.

FIG. 7 illustrates an alternative manner in which amplifier unit 7 may be linked to a subscriber line, e.g. "3," identified by numeral 31. If the system may be directly connected to the telephone circuit, a relay 32 may be connected across line 31, with the interconnection of a capacitor 33. A transformer 34 is made to close the subscriber line, providing at its secondary an output leading to the afore-mentioned amplifier unit 7. It is well known that the average telephone-line impedance is around 500 to 600 ohms. The lifting of the handset reduces the impedance and this, as is conventional in hitherto used telephone systems, initiates the operation of the central equipment. The primary of transformer 34 is given an impedance high enough not to "short" the line or reduce its impedance below the admissible level. However, with low-impedance secondaries, a capacitor may be used in series connection so as to prevent a D.C. "short" across the telephone line. Only one relay contact has been shown in a schematic manner, not being necessary for the understanding of the present invention.

Relay 32 will be energized by the ringing signal so as to perform certain switching functions, e.g. connecting the supply circuit 11 to the terminal circuit 6; starting the motor of a centralized dictating system; etc. In the following, the layout of FIG. 1 will be considered for the sake of clearer understanding, although the same would apply to the alternative circuit of FIG. 7.

It should be noted in this connection that a simple microphone 5 has been shown in FIGS. 1 and 1*a* for picking up audible signals from the respective receivers 355, 355*a*. However, a pick-up coil (not shown) can be used instead of microphone 5, fitted over the receiver, for picking up signals by magnetic induction. This system being used in certain telephone answering devices which avoid interference with the electrical circuits of the telephone company, it can serve the purpose of the inventive remote-control system as well.

We now come to the detailed description of the circuitry forming part of control unit 10. As is shown in FIG. 1, amplifier stage 9 has an output 99 leading to unit 10, coming from the last stage represented by electron tube 98. The plate of this tube is not connected to B+ supply, as usual. The positive pole of the supply circuit 11 which feeds, among others, amplifier 9, forms one pole of the output lead 99 while the other goes to the plate of said tube 98. It will be understood by those skilled in the art that the same arrangement could be used if amplifier 9 had a transistorized final stage instead of tube 98. In the following, reference will only be had to the elements of FIG. 1 although it should be understood that the corresponding alternative elements (e.g., stations 2*a*, 3*a* in lieu of 2, 3, or receiver 355*a* substituting 355, etc.) will perform in a similar manner, particularly as far as the operation of the control unit is concerned.

As long as amplifier 9 is energized over 11 (that is, in the connected condition of the terminal circuit 6), a certain plate current will steadily flow in the leads 99. One lead reaches a sensing relay 101 over a dropping resistor 102 while the other passes over a normally closed contact 1031 of relay 103 to be explained later. Relay 101 is, therefore, normally energized (as shown) so that its switch-over contact 1011 connects ground from pole 104*b* of a 115 v. A.C. supply toward a relay system, shown on the left-hand side of FIG. 8, which, however, has no function at this moment. The A.C. supply 104*a*, 104*b* forms part of the electric supply circuit 11, together with poles 105*a*, 105*b* of a 24 v. D.C. supply. It is seen that 104*b*, 105*b* are common and at the same ground potential.

The control unit 10 comprises a stepping switch 106 of conventional type, having a wiper 106*a* and a plurality of single-pole contact positions 106*b* consecutively swept by wiper 106*a* as it is moved step by step owing to the action of a stepping relay 107. A homing relay is shown at 108 which, for example, releases the latching of wiper 106*a* so that it can return to its initial position on effect of a coil spring or the like (not shown). Relay 108 forms part of a rejecting circuit for returning the switch 106 to its rest position, to be described later in more detail.

Wiper 106*a* is shown in its rest position identified by contact 106*b* marked "0"; from there, it rotates in clockwise direction, passing contacts "1" through "30," and two more contacts, marked "31" and "32," before returning to "zero" again. As a matter of example, thirty-three contacts 106*b* are shown herein but it will be understood that the system may comprise a stepping switch with a larger or smaller number of contacts.

Switch 106 also has an arcuate contact member 106c directly connected to ground (line 104b). This member is not being touched by wiper 106a except in the illustrated rest position (at contact "0") and the two last contact positions (between "30" and "0").

A relay 109 has one of its winding terminals connected directly to the plus pole 105a of the 24 v. D.C. supply, while the other terminal leads to the first contact 106b marked "0." In the illustrated position of switch 106, the following circuit is completed:

Plus 24 v.—lead 105a—relay 109—contact 106b "0"—wiper 106a—contact member 106c—lead 104b or 105b—minus 24 v. . . . (1).

This will energize relay 109 so as to interrupt both of its normally closed contacts 1091, 1092, as shown. Contact 1091, in the de-energized condition of relay 109, applies +24 v. from lead 105a to one terminal of relay 103 and also to one of the terminals of relays 110, 111 and 112. The connection of the other terminals of each of these four relays will be explained as the circuit description proceeds.

Since relay 101 is in series with the last-stage plate circuit of amplifier 9 over output leads 99 (unless relay 103 interrupts one of the leads with its normally closed contact 1031), it is continually traversed by the plate current even if there is no signal arriving at stage 9. As soon as a signal is impressed upon amplifier stage 9, in the following circuit:

Coded signal 4—microphone 254—station 2—circuit 1—station 3—receiver 355—microphone 5—amplifier 7—filter unit 8 . . . (2), a current drop will occur in the plate circuit of tube 98 of amplifier 9, so that relay 101 will be de-energized in the cadence of the signals. In the example explained for FIG. 1, this was "five-three-four." Resistor 102 serves to adapt the sensitivity of relay 101, preferably having a winding for 80 v. D.C., to the current rate of amplifier stage 98. As a matter of example, a resistor of 10K ohms has been found satisfactory, in conjunction with a 12AU7 electron tube.

As relay 101 rhythmically drops and restores, in response to the coded signal transmitted over the circuit according to (2), its contact 1011 applies ground from 104b to one winding terminal of stepping relay 107. The circuit shows that pole 104a of the 115 v. supply is directly connected to the windings of both relays 107, 108 which act upon stepping switch 106. At 113, capacitors are shown (preferably having a value of .25 mf. each) for quenching any possible sparks that may occur during the operation of the pertaining contacts, such as 1011 for energizing stepping relay 107, etc.

Depending on the number of pulses received without appreciable interruption, wiper 106a will move step by step and eventually stop, in the above example, on contact 106b numbered "5."

Before the co-operation of the stepping switch 106 with the relay circuit can be explained, details of a distributor or switching panel 114 will be given. Each of contacts 106b, except the afore-mentioned contact "0" and the two last contacts in sequence, are one by one connected to a series of jacks 114a identified by corresponding numerals, e.g. "1," "2," "5," "10," etc., through "28." For the sake of clarity, only contacts "1" through "5," "8," "12," "20" through "22," "27" and "28" have been connected to the respective jacks.

Three plugs, 114b, 114c and 114d, are secured to the ends of flexible leads, two of which go to relay 110 while the third goes to relay 111. The plugs are identified by encircled numbers "1," "2" and "3," denoting the first, second and third digits, respectively, of the coded signal. The row of jacks 114a and the plugs 114b–114d allow to set the control unit 10 to any combination of code signals, such as "nine-seven-six," or "two-four-two," to name just two, besides the above-explained exemplary combination "five-three-four."

It will be understood that the last-named combination, shown in FIG. 1 at 4, necessitates the wiper 106a to stop at contact positions "5," "8" and "12" (because 5+3=8, and 5+3+4=12). Also, the additional examples would require a stepwise wiper operation to positions "9," "16," "22," and "2," "6," "8," respectively.

Each of the jacks 114a has a short-circuiting contact 114e which, when no plug is inserted, connects the particular lead of the respective contact position 106b to a common line or bar 115, the other end of which goes to a normally open contact 1161 of a delayed-action releasing relay 116. Bar 115 and contact 1161 also form part of the previously mentioned rejecting circuit. Thus, those contacts 106b of stepping switch 106 which have one of the plugs 114b, 114c or 114d inserted in their respective jacks, connect to relays 110 or 111, while all the remaining contacts 106b (from among those numbered "2" through "28") connect to relay 116 since contacts 114e are in their rest positions, in engagement with bar or line 115. Dummy plugs 114f will be explained later.

Figure 8:
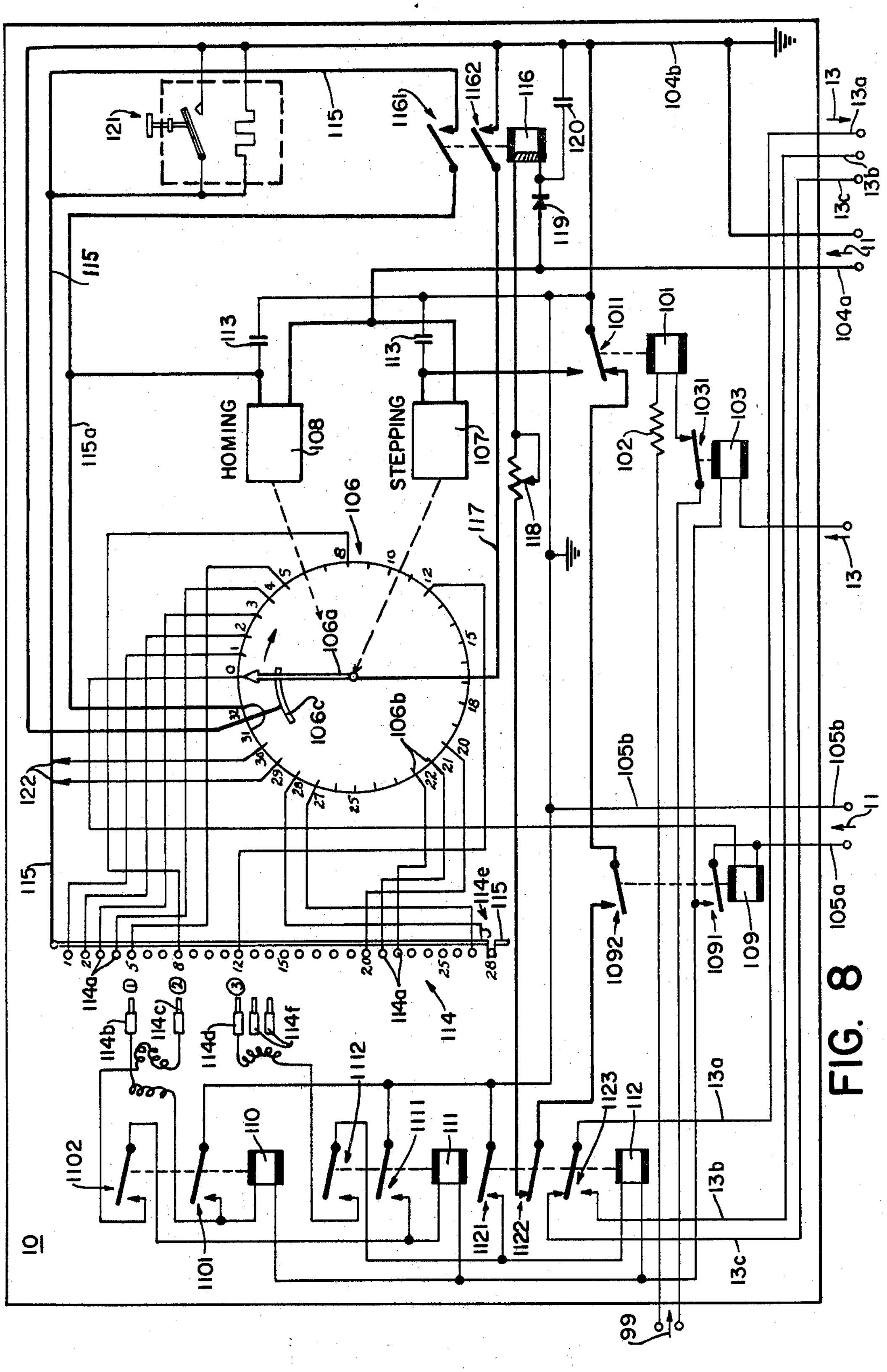
FIG. 8 is an electrical circuit diagram of the control unit forming part of the receiving units of FIGS. 1 or 1*a*.

For the sake of clarity, the drawings, and particularly FIG. 8, have not been supplemented by voltage values, e.g., for operating the various relays. It should therefore be noted that the exemplary circuit provides 24 v. D.C. operation for relays 103 and 109 through 112; 80 v. D.C. supply for relay 101; conventional 115 v. A.C. energization for relays 107 and 108; and finally 110 to 115 v. D.C. supply for relay 116.

It should be noted that the provision of switching panel 113 represents a convenience if frequent changes are to be made in the coding and/or functions to be performed by the same unit 10. However, if a pre-set code arrangement is satisfactory, the panel 114 may be omitted altogether, each of the leads of the plugs 114b–114d being then directly wired to the contacts, e.g. to "5," "8" and "12." By simple re-soldering, the code signal may, of course, be changed even with the simplified arrangement which does not have a panel 114.

In the following, the operation of the control unit 10 will be described, together with the rest of the relays contained therein, based upon the exemplary code signal "five-three-four" for which the plugs are to be visualized as inserted in the respective jacks which they are facing in FIG. 8. Let us assume that in the circuit and connection of either FIG. 1, or FIG. 1*a*, the first group of five digits or signals of the pre-set frequency have been emitted by any of the devices shown at 4a, 4b or 4c.

Relay 101 will then be de-energized five times, allowing stepping relay 107 to move wiper 106a from contact position "0" to position "5." From the moment that wiper 106a leaves contact "0," the ground connection from pole 104b and contact member 106c does not prevail any more with regard to contact 106b "0," so that relay 109 drops and connects at 1091 one of the relay terminals 110, 111, 112 and also 103 to line 105a of the 24 v. supply.

Simultaneously, contact 1092 applies ground 104b to one terminal of relay 116 in the following circuit:

Lead 104b—contact 1011 operated—contact 1092 at rest—contact 1122 at rest . . . (3).

Now that wiper 106a is at position "5," its feed line 117 applies the other pole 105b of the 24 v. supply to relay 110 in the following circuit:

Lead 105b or 104b—contact 1162 operated—lead 117—wiper 106a—contact 106b "5"—plug 114b—relay 110 . . . (4).

Relay 110 holds itself with its operated contact 1101 from a common lead which also connects lead 105b to similar normally open contacts 1111 and 1121 the respective relays 111, 112. Contact 1102 of relay 110, at the same time, prepares a circuit for the next expected code position "8" from plug 114c to relay 111 which, however, is not yet energized at this point.

For the sake of a continuous description of the operation, it will first be assumed that the next group of three signals will be properly received in the previously described manner. An erroneous or faulty stepping of switch 105, e.g. to any of the intermediate positions such as "6" or "7," or beyond "8," will be explained later.

As relay 101 is again de-energized, this time three times, wiper 106a will be moved from position "5" to "8." Relay 111 will now become energized as follows:

Lead 105b or 104b—contact 1162 operated—lead 117—wiper 106a—contact 106b "8"—plug 114c—contact 1102 operated—relay 111 . . . (5).

The other terminal of this relay 111 is connected to lead 105a over contact 1091 at rest. The same relay 111 holds itself with its operated contact 1111 while another contact 1112 simultaneously prepares the circuit for the next or last signal, that is position "12" from plug 114d to relay 112 for subsequent energization, when wiper 106a reaches said contact position 106b "12" after the third sequence of four signals.

Relay 112 will be energized as follows:

Lead 105b or 104b—contact 1162 operated—lead 117—wiper 106a—contact 106b "12"—plug 114d—contact 1112 operated—relay 112 . . . (6).

The other terminal of this relay, too, is connected to lead 105a over contact 1091 at rest. From the preceding description it will be clear that relays 110, 111 and 112 successively hold themselves as wiper 106a reaches its consecutive first, second and third predetermined positions. Relay 112 holds itself with its operated contact 1121. All three relays will stay energized as long as relay 109 is de-energized. This is so in all wiper positions except "0" wherein ground is picked up from contact 106c and lead 104b.

Relay 112 has a third, switch-over type contact 1123 which is adapted to perform the actual control function. In the exemplary embodiment of the inventive circuit, lines 13 are shown to interconnect the controlled unit 12 with the terminals of contact 1123. Before wiper 106a has reached the predetermined final position, viz, "12" in our example, relay 112 is at rest, and lines 13a and 13c are interconnected. However, upon successful operation, when relay 112 pulls up, it will be lines 13a and 13b which are connected. The switch-over action from one pole to the other allows various functions to be performed, e.g. connecting, disconnecting, or switching over one or possibly more electrical circuits.

It is deemed to be superfluous to go into further details of the functions that can be performed by way of relay 112 and of a controlling circuit of which lines 13 are representative. Said relay may have more contacts, operating separate independent circuits; also, the controlled unit 12 may itself have a relay or other type of switching means actuated by the switch-over contact 1123, depending upon the tasks ultimately to be performed by the terminal circuit 6.

Now that the proper or predetermined sequential operation of stepping switch 106 and the associated relays has been described, in the event of a properly emitted, transmitted and received coded signal 4, the alternative operation of the system will be explained in the event of an erroneous or faulty stepping of switch 106.

Let us assume, therefore, that more than five steps have been made by wiper 106a, owing to some disturbance in the chain referred to hereinabove as circuit (2), for the first digit of the coded signal. Or, possibly, less than eight steps have been performed thereby by the end of the second digit, etc. This will bring wiper 106a to one of the contact positions 106b intermediate those in connection with the plugs 114b, 114c, etc., said position being "6," "7," "9" or other, all of which are in connection with line or bar 115 owing to the absence of a plug in the respective jacks 114a.

In circuit (3), hereinabove, it has already been mentioned that when wiper 106a leaves contact position "0," relay 109 becomes de-energized so that the supply circuit is closed for relay 116. As shown in the circuit of FIG. 8, a variable resistor 118 is intercalated between contact 1122 and one terminal of relay 116 which is a delayed-action relay (identified by the schematic hatched area denoting a copper ring or the like therearound). It has been found that a maximum resistance of 2K ohms, at max. 5 watts, is a safe value for resistor 118. Owing to its provision, relay 116 will not pull up immediately upon relay 109 dropping out; the adjustable wiper of resistor 118 will be set to a value at which the time required for a sufficient magnetic field to build up in relay 116 slightly exceeds the time span required for the second or third code digit to actuate switch 105.

Relay 116 has two normally open contacts 1161 and 1162. These contacts have already been mentioned in connection with the circuit of bar 115 and with the circuit (4), respectively. Thus, contact 1161 is adapted to interconnect common line or bar 115 of the switching panel 114 to the other winding terminal or pole of homing relay 108, these circuit elements constituting a rejecting circuit (the first pole of relay 108 is common with that of stepping relay 107 and has been described with regard to the function of relay 101). Contact 1162, on the other hand, brings ground potential to wiper 106a when relay 116 is on.

Relay 116 is fed by rectified 110 to 115 v. rather than by A.C. for a more reliable operation, over a rectifier unit schematically shown at 119. It will be understood that this could also be a two-sided rather than a single-sided rectifier unit. A filter capacitor 120, preferably of 80 mf., is connected between the A.C. lead 104b and the junction of rectifier 119 and relay 116, for smoothing the half-rectified supply.

With wiper 106a stopped at positions "6," "7" or "9," for example, the following circuit will become effective:

Lead 104b—contact 1162 operated—lead 117—wiper 106a—contact 106b, e.g. position "6"—jack 114a "6"—bar 115—contact 1161 operated—homing relay 108—lead 104a . . . (7).

This will result in immediate homing of the wiper 106a to contact position "0," as previously described, wherein relay 109 is again energized, relay 116 is cut off, so that the system is ready to receive another (correct) digit. If, for instance, a whistle 4c is used for emitting the coded signal sequence, and the user notices an error made, e.g. in the number of "beeps," or the length of the interval between first and second digits, all that has to be done is to wait a few seconds to allow releasing relay 116 to restore the system to the initial position, and start all over again.

Alternatively, an unauthorized user may attempt to keep on adding a digit or two, assuming that he will eventually reach an operative position (e.g. for obtaining playback of messages accumulated in a phone-answering system to which the remote-control system is connected). All that happens is that the operation is even further garbled and effective operation made impossible.

It will be noted that, according to circuit (3), relay 112 has to be non-operated (that is, contact 1122 at rest) for relay 116 to become energized and allow homing relay 108 to work. Thus, upon having reached the predetermined third position, that is, "12" in our example, there is no erroneous-action homing thereafter (meaning, in the example, at contact positions "13" through "28"). Actually, additional code signals might be transmitted for performing additional functions, as will be described somewhat later with reference to contact positions 106b "29" and "30."

The control unit 10 also provides for a delayed-action homing, as follows: Assuming that wiper 106a has been brought to one of the predetermined positions 106b (e.g. "5" or "8"), but no further signals arrive which would bring it either to the third predetermined contact position ("12") or, alternately, to one of the homing positions (e.g. "6" or "9") which would initiate circuit (7). So as to avoid the unit to become blocked and incapacitated for subsequent operation, contact 1162 of relay 116, wiper 106*a* and the contact and jack system 106*b*, 114*a* with common bar or line 115 are substituted by the following circuit:

Lead 104*b*—a thermal relay 121—line 115—contact 1161 operated—relay 108—lead 104*a* . . . (8), wherein relay 121 is connected across leads 104*b* and 115, and comprises a winding applied in the region of, or around, a bimetallic strip known per se, and constituting a normally open contact between leads 104*b* and 115. Relay 121 is thus series-connected with homing relay 108 as long as relay 116 is energized. The respective resistance values are chosen so that it will take about 4 to 6 seconds for the bimetallic strip to short the above-mentioned contact, thereby applying full current to relay 108, resulting in the homing of wiper 106*a* to position "0." An adjusting screw is schematically shown in unit 121, allowing which will preset the time period to elapse before the normally open contact is closed.

Following the operation according to either circuit (7) or (8), relay 109 will again be energized, disconnecting thereby the supply circuits of relays 103 and 110–112 (by contact 1091) and that of relay 116 (by contact 1092). This is the condition that has been described hereinabove under (1) and thereafter. The terminal unit is now ready to receive another incoming signal.

Relay 103 has been mentioned cursorily in connection with relay 101, and with regard to contact 1091. When relay 101 is off, +24 v. runs from lead 105*a* to one winding terminal of relay 103. The other terminal is connected to the controlled unit 12 from where it may receive minus potential (as from lead 105*b* or ground). This will energize relay 103 and open its normally closed contact 1031 which interrupts the supply circuit 99 of relay 101.

This feature may prove useful, for example, when the inventive remote-control system cooperates with a dictating, telephone answering or similar arrangement. As a matter of example, it may be the purpose of the terminal unit 6 to provide playback of a prerecorded message or dictation from a continuous-type record carrier such as an endless tape or an annular belt. It may, furthermore, be an added function to allow said record carrier to run to the end of the recording track or tracks, either before or after said playback.

In such systems, the controlled unit 12 may comprise a normally open contact (not shown) which will ground said other terminal of relay 103 upon reaching the end of the recording track. Such contacts are customary to indicate the tape end, e.g. by means of a signal lamp; thus, existing circuitry of the controlled device may be used without any alteration to furnish a single signal pulse for the remote-control system.

When relay 101 drops momentarily, stepping relay 107 is energized so that wiper 106*a* will make an additional step, that is, to position "13." At the distributor panel 114, a dummy or unconnected plug 114*f* is shown ready for insertion in jacks 114*a* of positions "13" and "14," the two positions following the last predetermined digit, "12." Homing is thus avoided since there is no circuit between these additional steps and homing relay 108, as was described under (7).

Relay 103 may be operated more than once, each deenergization providing for an extra step made by wiper 106*a*, thus to position "14," if need be. This circuit, although not necessary for the primary functioning of the terminal unit, will allow added switching or controlling functions to be performed in addition to those accomplished by relay 112, e.g. with contact 1123.

Plugs 114*f* may have leads connected thereto for providing a supply circuit from ground (105*b*) toward another relay (not shown), in a manner similar to circuit (4).

Stepping switch 106 is shown with two contacts between positions "30" and "0," identified as "31" and "32," wired to common lead 115*a* that goes directly to relay 108, bypassing contact 1161 of lead 115. Once the unmarked positions have been reached, wiper 106*a* will immediately apply ground to the homing relay 108 owing to the provision of the arcuate contact member 106*c* which is at ground potential. This will allow homing even if ground connection from 104*b* might be interrupted through contact 1162 and line 117.

In the description of the panel 114 it has been mentioned that only contacts 106*b* identified as "1" through "28" are connected thereto. FIG. 8 shows that additional or supernumerary positions "29" and "30" have leads of their own, marked 122, which may serve for individual control functions similar to those mentioned with regard to some relays operable through the leads coming, optionally, from plugs 114*f*, hereinabove. These two positions are preset and not settable with panel 114 in dependence of the code signal scheme. The additional switching or controlling functions that can be performed through these two positions further broaden the scope of applications of the inventive remote-control system.

For practical purposes, it should be noted that the signal code system may be composed of—say—three digits ranging from "1" through "10," if three relays are provided in the system, like relays 110, 111 and 112. The lowest combination would thus be "one-one-one" and the highest "zero/ten 'beeps'/-zero-zero." It is, however, advisable not to use subsequent contact positions, but rather leave at least one position vacant between subsequent digits. This will increase operational safety since an erroneous stepping of the wiper will not reach the next following, predetermined, but an intermediate, homing position. Even so close to 150 different combinations are feasible in a system comprising a switch with thirty-three contact positions.

While acoustic coupling has been shown in both FIGS. 1 and 1*a*, both for the sending and the receiving stations, it will be understood that electrical coupling between the sound generating means and the sending or calling station, on the one hand, and the receiving or called station and the sound receiving means, on the other hand, is entirely feasible without interfering with the operation of the signal circuit to which the remote-control system is connected. The filter means of course eliminates any signals that would interfere with the proper operation of the inventive remote-control system, and this includes the signals of the primary signal-transmission operation.

The foregoing disclosure relates only to preferred, exemplary embodiments of the invention which is intended to include all changes and modifications of the examples described, within the scope of the invention as set forth in the appended claims.

I claim:

1. A remote-control system for controlling at least one function of a controlled unit operatively connected to a receiving station, from a sending station connected to said receiving station over a signal transmission circuit also used for the transmision of human sounds or artificial signals other than control signals for said receiving station, comprising, in combination, sound generating means of a discrete audio frequency at said sensing station, said sound being emitted in at least two spaced-apart groups of consecutive beeps forming a coded signal, sound receiving means at said receiving station, filter means connected to said sound receiving means for excluding frequencies other than said discrete frequency, multi-position switching means movable from a rest position over and to a plurality of contact positions, sensing relay means normally energized by current derived from the output of said filter means, said coded signal producing a plurality of momentary current drops in said output current of the filter means corresponding to the number of beeps contained therein, said sensing relay means being connected for successively moving said switching means over said contact positions one step at a time owing to its deenergization by each of said beeps, first circuit means fed by a first source of current and including first relay means energized in said rest position of the switching means and second relay means energized in a predetermined one of said contact positions, the number of steps required for reaching said predetermined contact position corresponding to the sum of said beeps contained in a predetermined coded signal at which said function of the controlled unit is to be performed, there being a separate predetermined contact position and a separate relay in said second relay means for each of said predetermined contact positions, and second circuit means fed by a second source of current and including third relay means energized in any of said contact positions of the switching means other than said predetermined position if both of said first and said second relay means are de-energized, said switching means forming part of both of said first and said second circuit means, said first circuit means further including an operating circuit for said controlled unit so as to perform said function, said second circuit means further including a rejecting circuit for returning said switching means to said rest position from any of said other contact positions.

2. A remote-control system according to claim 1, wherein both said sound generating means and said filter means are tuned to the same discrete frequency which is within the range of approximately 3000 to 5000 cycles, above the range of the human sound to be transmitted over said signal transmission circuit.

3. A remote-control system according to claim 1, wherein both said sound generating means and said sound receiving means are acoustically coupled to the respective sending and receiving stations.

4. A remote-control system according to claim 1, further comprising at least one amplifier means associated with said filter means and including an output stage traversed by plate current in series connection with said sensing relay means.

5. A remote-control system according to claim 4, wherein said first circuit means further includes fourth relay means, normally closed contact means of the latter intercalated between said output stage and said sensing relay means, and normally closed contact means of said first relay means for preparing a supply path for said fourth relay means from said first source, an extraneous contact in said controlled unit completing said supply path when said first relay means is de-energized, whereby said sensing relay means is momentarily de-energized so as to move said switching means another step to a subsequent one of said contact positions.

6. A remote-control system according to claim 1, wherein said second circuit means further includes a time-controlled homing circuit for returning said switching means to said rest position from a first predetermined contact position in the absence of subsequent de-energization of said sensing relay means which would move said switching means to a second predetermined contact position.

7. A remote-control system according to claim 6, wherein said homing circuit includes a normally open bimetal switch providing a bypass from one pole of said second source to said rejecting circuit, and heating means for said bimetal switch in parallel connection therewith.

8. A remote-control system according to claim 7, wherein said rejecting circuit includes homing relay means energized by the operation of said third relay means for returning said switching means to said rest position, said parallel-connected bimetal switch and heating means being connected in series with said homing relay means in the operated condition of said third relay means.

9. A remote-control system according to claim 1, wherein the supply path for said third relay means includes a rectifier and a variable resistor, said third relay means being of the delayed action type, the delay being adjustable by means of said resistor.

10. A remote-control system according to claim 1, wherein said switching means includes a wiper adapted successively to move from said rest position over said contact positions upon stepwise de-energization of said sensing relay means in the cadence of said coded signal, and a contact member connected to one pole of said second source and adapted to contact said wiper in said rest position, said one pole of the second source being common with one pole of said first source, whereby a supply path is provided for said first relay means in said rest position.

11. A remote-control system according to claim 1, wherein said first circuit means further includes at least one fifth relay means energized in an intermediate predetermined contact position, the number of steps required for reaching said intermediate contact position corresponding to the sum of said beeps contained in one of said beep groups of said predetermined coded signal at which an interval is provided between said groups, at least one of said second and said fifth relay means having a self-holding circuit, said fifth relay means having a normally open contact associated therewith for preparing the supply path for said second relay means upon energization of said fifth relay means.

12. A remote-control system according to claim 1, further comprising a switching panel forming part of both of said first and said second circuit means and including a contact jack for each of said contact positions of the switching means and electrically connected therewith, a common contact bar connected to said rejecting circuit, at least some of said jacks being in the form of short-circuiting jacks normally interconnecting said common bar with the respective contact position, and at least one contact plug insertable in any one of said jacks and connected to said second relay means for providing a supply path therefor, whereby the wiring of said switching means can be changed it will so as to provide said predetermined contact position at any one of the contact positions connected to said switching panel by insertion of said contact plug in the corresponding contact jack, the vacant jacks co-operating in returning said switching means to said rest position from any of said other contact positions.

13. A remote-control system according to claim 12, wherein said switching means further includes at least one supernumerary contact position providing a supply path from said first source over said switching means, so as to perform additional functions in said controlled unit upon additional de-energization of said sensing relay means a predetermined number of times corresponding to said supernumerary contact position.

14. A remote-control system according to claim 1, wherein said sound generating means includes oscillator means having an output of said discrete frequency, and means for intermittently blocking said output so as to form said groups of beeps forming said coded signal.

15. A remote-control system according to claim 14, wherein said blocking means includes a motor and at least one cam disc driven thereby, and a plurality of contacts on said disc for blocking said output in the cadence of said coded signal.

16. A remote-control system according to claim 1, wherein said filter means includes an electro-mechanical transducer connected to the output of said sound receiving means and a mechano-electrical transducer from which said current is derived for the sensing relay means, and at least one resilient linking member connected between said transducers, providing a self-resonant mechanical link in the electrical circuit of said receiving station which excludes frequencies other than said discrete frequency produced by said sound generating means.

17. A remote-control system for controlling at least one function of a controlled unit operatively connected to a called telephone subscriber's station, from any calling telephone station connectable to said subscriber's station over a conventional telephone network, used for the transmission of intelligence and signals other than control signals for said called station, comprising, in combination, sound generating means of a discrete audio frequency at said calling station, said sound being emitted in at least two spaced-apart groups of consecutive beeps forming a coded signal, means at said called station for sensing the first one of said signals and energizing a terminal circuit connected to said called station, sound receiving means in said terminal circuit, filter means connected to said sound receiving means for excluding frequencies other than said discrete frequency, multi-position switching means movable from a rest position over and to a plurality of contact positions, sensing relay means normally energized by current derived from the output of said filter means, said coded signal producing a plurality of momentary current drops in said output current of the filter means corresponding to the number of beeps contained therein, said sensing relay means being connected for successively moving said switching means over said contact positions one step at a time owing to its de-energization by each of said beeps, first circuit means fed by a first source of current and including first relay means energized in said rest position of the switching means and second relay means energized in a predetermined one of said contact positions, the number of steps required for reaching said predetermined contact position corresponding to the sum of said beeps contained in a predetermined coded signal at which said function of the controlled unit is to be performed, there being a separate predetermined contact position and a separate relay in said second relay means for each of said predetermined contact positions, and second circuit means fed by a second source of current and including third relay means energized in any of said contact positions of the switching means other than said predetermined position if both of said first and said second relay means are de-energized, said switching means forming part of both of said first and said second circuit means, said first circuit means further including an operating circuit for said controlled unit so as to perform said function, said second circuit means further including a rejecting circuit for returning said switching means to said rest position from any of said other contact positions.

References Cited

UNITED STATES PATENTS 2,553,084 5/1951 Favre ---------------- 340—164
2,810,017 10/1957 Tyszkiewicz --------------- 179

ROBERT L. GRIFFIN, *Primary Examiner.*

DAVID G. REDINBAUGH, JOHN W. CALDWELL, *Examiners.*

J. T. STRATMAN, *Assistant Examiner.*

UNITED STATES PATENT OFFICE

CERTIFICATE OF CORRECTION

Patent No. 3,384,713 May 21, 1968

Noel G. Duncan

It is hereby certified that error appears in the above numbered patent requiring correction and that the said Letters Patent should read as corrected below.

Column 16, line 36, for "it" read -- at --.

Signed and sealed this 10th day of June 1969.

(SEAL)
Attest:

Edward M. Fletcher, Jr.
Attesting Officer

WILLIAM E. SCHUYLER, JR.
Commissioner of Patents